US010430815B1

(12) United States Patent
Comer et al.

(10) Patent No.: US 10,430,815 B1
(45) Date of Patent: Oct. 1, 2019

(54) SYSTEM AND METHOD FOR OPTIMIZING THE USE OF MOBILE DEVICES TO COMPLETE ONLINE SURVEYS

(71) Applicant: Lucid Holdings, LLC, New Orleans, LA (US)

(72) Inventors: Patrick B. Comer, Luling, LA (US); Vignesh Krishnan, New Orleans, LA (US)

(73) Assignee: Lucid Holdings, LLC, New Orleans, LA (US)

( * ) Notice: Subject to any disclaimer, the term of this patent is extended or adjusted under 35 U.S.C. 154(b) by 1121 days.

(21) Appl. No.: 14/513,940

(22) Filed: Oct. 14, 2014

Related U.S. Application Data

(60) Provisional application No. 61/890,695, filed on Oct. 14, 2013.

(51) Int. Cl.
*G06Q 30/02* (2012.01)

(52) U.S. Cl.
CPC ......... *G06Q 30/0203* (2013.01); *G06Q 30/02* (2013.01)

(58) Field of Classification Search
CPC ............................ G06Q 30/0203; G06Q 30/02
USPC ................. 705/14.19, 7.29, 7.32; 455/414.2
See application file for complete search history.

(56) References Cited

U.S. PATENT DOCUMENTS

| 6,999,987 | B1 | 2/2006 | Billingsley et al. | |
| 7,058,590 | B2* | 6/2006 | Shan | G06Q 30/02 |
| | | | | 705/7.29 |
| 7,539,696 | B1 | 5/2009 | Greener et al. | |
| 9,202,224 | B2* | 12/2015 | Kilar | G06Q 30/02 |
| 2002/0128898 | A1* | 9/2002 | Smith, Jr. | G06Q 10/06 |
| | | | | 705/7.32 |
| 2002/0152092 | A1 | 10/2002 | Bibas et al. | |
| 2003/0195793 | A1* | 10/2003 | Jain | G06Q 30/02 |
| | | | | 705/7.32 |
| 2005/0075919 | A1 | 4/2005 | Kim | |
| 2007/0192166 | A1 | 8/2007 | Van Luchene | |

(Continued)

OTHER PUBLICATIONS

Comparing response rates in e-mail and paper surveys: A meta-analysis, Tse-Hua et al., University of Virginia, received in revised form Oct. 8, 2007; accepted Jan. 24, 2008 (Year: 2008).*

(Continued)

*Primary Examiner* — Timothy Padot
*Assistant Examiner* — Darlene Garcia-Guerra
(74) *Attorney, Agent, or Firm* — Schwegman Lundberg & Woessner, P.A.

(57) ABSTRACT

An online survey platform and process for routing respondents who are attempting to take a survey from a mobile device to mobile-friendly surveys, thereby increasing the overall efficiency of the survey platform. A survey platform embodying features of the present invention comprises a plurality of online surveys hosted on the survey platform. When a respondent enters the survey platform for the purpose of taking an online survey, the survey platform will access the respondent's device information and prepare a list of available surveys. The survey platform will then determine whether the survey's mobile conversion delta meets the panel supplier's threshold requirements and, if so, route the respondent to one of the qualified surveys.

15 Claims, 7 Drawing Sheets

(56) References Cited

U.S. PATENT DOCUMENTS

| | | | |
|---|---|---|---|
| 2007/0192179 A1* | 8/2007 | Van Luchene | G06F 17/30864 705/14.39 |
| 2008/0065565 A1 | 3/2008 | Walker et al. | |
| 2008/0085675 A1* | 4/2008 | Rao | G06Q 30/02 455/2.01 |
| 2008/0109278 A1 | 5/2008 | Rao | |
| 2008/0214162 A1* | 9/2008 | Ramer | G06F 17/30749 455/414.2 |
| 2008/0313010 A1* | 12/2008 | Jepson | G06Q 30/02 705/7.32 |
| 2009/0018893 A1* | 1/2009 | Aviv | G06Q 30/0203 705/7.32 |
| 2009/0106084 A1* | 4/2009 | Or | G06Q 30/0204 705/7.33 |
| 2010/0043080 A1 | 2/2010 | Overpeck | |
| 2010/0280906 A1 | 11/2010 | Lim et al. | |
| 2011/0145043 A1 | 6/2011 | Handel | |
| 2012/0095796 A1* | 4/2012 | Gately | G06Q 10/06311 705/7.13 |
| 2012/0130934 A1 | 5/2012 | Brillhart et al. | |
| 2012/0158478 A1 | 6/2012 | Holder | |
| 2012/0173305 A1 | 7/2012 | Bhaskaran | |
| 2012/0316921 A1* | 12/2012 | Carsanaro | G06Q 30/0201 705/7.32 |
| 2013/0014153 A1* | 1/2013 | Bhatia | H04N 21/252 725/24 |
| 2013/0024211 A1* | 1/2013 | Monteforte | G06Q 30/0268 705/3 |
| 2014/0113267 A1* | 4/2014 | St. Hilaire | G06Q 30/0203 434/362 |
| 2014/0280609 A1* | 9/2014 | Averbeck | H04L 51/34 709/206 |
| 2015/0324811 A1* | 11/2015 | Courtright | G06Q 30/02 705/7.32 |

OTHER PUBLICATIONS

A survey of multimedia content adaptation for mobile devices, Velibor Adzic & Hari Kalva & Borko Furht, Published online: Dec. 9, 2010, Springer Science + Business Media, LLC 2010, Multimed Tools Appl (2011) (Year: 2010).*

Method for Routing Online Survey Participants: U.S. Appl. No. 14/251,425, filed Apr. 11, 2014, inventors: Patrick B. Comer, Karunakaran Sureshkumar, Alex Leger and Vignesh Krishnan, specification, claims, abstract and drawings, 38 pages.

Auto Compensation Calculator: U.S. Appl. No. 14/251,449, filed Apr. 11, 2014, inventors: Patrick B. Comer, Karunakaran Sureshkumar, Alex Leger and Vignesh Krishnan, specification, claims, abstract and drawings, 39 pages.

Dynamic Price Matching Method: U.S. Appl. No. 14/251,434, filed Apr. 11, 2014, inventors: Patrick B. Comer, Karunakaran Sureshkumar, Alex Leger and Vignesh Krishnan, specification, claims, abstract and drawings, 36 pages.

* cited by examiner

SYSTEM AND METHOD FOR OPTIMIZING THE USE OF MOBILE DEVICES TO COMPLETE ONLINE SURVEYS

CROSS-REFERENCE TO RELATED APPLICATION

This application claims the benefit of U.S. Provisional Application No. 61/890,695 filed Oct. 14, 2013, which is hereby incorporated by reference.

BACKGROUND

Companies are increasingly turning to online market research, such as online consumer surveys, in order to obtain hard data upon which to base important business decisions. To conduct an online consumer survey, a market research company will typically engage a supplier of a survey panel. Survey panels are a collection of potential survey participants (i.e., "respondents") available to complete online surveys. In cases where surveys need very specific and restrictive respondent demographics, multiple panels may be enlisted to complete the survey.

Online surveys may include demographic questions designed to determine whether the respondent meets predefined demographic criteria (e.g., age, gender, ethnicity, and/or income), targeted questions designed to determine whether the respondent meets predefined familiarity and/or utilization criteria for a certain product or service category (e.g., respondents who use a particular product, such as a beverage, at least three times per week), and substantive questions designed to gather objective data points for statistical and other analysis. Only respondents who meet the predefined criteria for the demographic questions and the targeted questions are prompted to respond to the substantive questions of the online survey. Respondents who do not meet the predefined criteria for any demographic or targeted question are terminated from that particular online survey (i.e., do not qualify for the survey). Also, a respondent may not qualify for an online survey because the respondent enters information indicating that he/she is in a category that is full. For example, surveys may seek a predefined mixture of respondents, such as 50% male and 50% female, and a predefined total number of 200 respondents. In this example, if 100 females have already responded to the survey, the next female respondent will not qualify for the survey.

From the market research company's perspective, the survey's success is dependent upon finding qualified respondents in a timely manner so that the survey is successfully completed in the stipulated time and with a favorable cost structure. Because multiple suppliers oftentimes must be engaged to meet the demographic requirements of the survey, intermediate companies deploy applications called "routers" to automate aspects of managing the multiple suppliers.

Routers utilize software to route respondents to an inventory of surveys. The router module of the survey management system has a two-fold responsibility. First, it is responsible for routing the respondents to appropriate surveys. Second, the router must view the survey pool holistically and affirm that the surveys collectively have a high chance of completion. For the latter responsibility, the router has to employ a combination of the contradictory aspects of randomization and prioritization to disperse respondents efficiently. Intelligent dispersion of respondents is one of the core features of a router. Thus, when a respondent fails to meet demographic criteria or familiarity/use criteria for a given online survey, the router matches the respondent's information against other online surveys in the pool and prompts the respondent with more questions to determine whether the respondent meets the demographic and familiarity/use criteria for a second online survey. If the respondent qualifies, he/she is prompted to respond to the substantive questions of the second online survey. Otherwise, the router continues to prompt the respondent with more questions for different online surveys in the pool.

FIG. 1 schematically illustrates online surveys within a router's survey management system. The router platform may host a plurality of online surveys including first survey 100, second survey 200, and third survey 300 in survey pool 1. First survey 100 may include screening questions 110 and substantive survey questions 120. Second survey 200 may include screening questions 210 and substantive survey questions 220. Third survey 300 may include screening questions 310 and substantive survey questions 320. The screening questions may include demographic questions and targeted questions. For example, screening questions 210 may include demographic questions 211 and 212 and targeted question 213. The router platform will present questions to a respondent until the respondent is qualified for a particular survey. Specifically, the respondent may be prompted to respond to demographic questions 111 ("What is your age?"), 112 ("What is your zip code?"), and 113 ("How many kids do you have?") of first survey 100. If the respondent did not qualify for first survey 100 based on his/her response to demographic question 113, then the respondent may be prompted to respond to targeted question 213 ("What brand of car did you purchase in the last 12 months?") of second survey 200. If the respondent qualifies, he/she is prompted to respond to the substantive questions 220 of the second survey 200. If the respondent does not qualify for the second survey 200, the respondent may be prompted to respond to demographic question 313 ("What's your ethnicity?") of third survey 300. The router will continue to direct the respondent to new screening questions until the respondent is qualified to participate in a survey hosted on the router platform.

The market research technology industry is seeing an increasing number of respondents using mobile and tablet devices to take surveys. Typically, the surveys that respondents take are built on websites and applications that use technologies like "flash" to display questions, answer options, and various animations to survey takers. These technologies are primarily aimed towards desktop and laptop users. Flash and other technologies are not well displayed on mobile and tablet devices, which result in negative and extremely low "conversion rates" (the ratio between the number of respondents who complete a survey, and the number of respondents who attempt to take a survey) amongst survey takers from a mobile or a tablet device. Another common scenario that currently challenges the survey taking experience is the inability to create optimized custom style sheets (CSSes) that support both desktop and mobile applications. These scenarios cause two primary challenges: 1) mobile respondents cannot take these surveys which leads to lower response rates (from the respondents) and slower completion time (for the surveys); or 2) mobile respondents ability to continue taking other surveys (which they may be eligible for) is terminated because the application on their device stops responding. Accordingly, there is a need for a survey platform and process capable of improving the user experience of respondents who take surveys using a mobile or a tablet device.

SUMMARY

The invention disclosed herein is directed to a system and process for optimizing an online survey platform in instances where respondents are utilizing mobile and tablet devices to take online surveys. In particular, the process of the present invention ensures that respondents who are attempting to take a survey from a mobile device will only be sent to surveys where they have a high possibility of taking and completing the survey, thereby increasing the overall efficiency of the survey platform.

In an embodiment of the present invention, a respondent enters the survey platform for the purpose of taking an online survey. The survey platform accesses the respondent's device information and prepares a list of available surveys. The survey platform then determines the mobile conversion rate (the total number of mobile survey completes divided by the total number of mobile survey entrants) and the mobile conversion delta (the difference in conversion rates between mobile applications and non-mobile applications) of each survey. If the threshold requirements provided by the panel supplier are met in one or more of the available surveys, the respondent will be routed to a qualified survey. If not, the survey platform will prepare a new list of available surveys and repeat the process of evaluating the panel supplier's threshold requirements against the mobile conversion rate and the mobile conversion delta for each survey.

The above summary is not intended to describe each illustrated embodiment or every possible implementation. These and other features, aspects, and advantages of the present invention will become better understood with regard to the following description, appended claims, and accompanying drawings.

BRIEF DESCRIPTION OF THE DRAWINGS

The accompanying figures, where like reference numerals refer to identical or functionally similar elements throughout the separate views, and which, together with the detailed description below, are incorporated in and form part of the specification, serve to illustrate further various embodiments and to explain various principles and advantages in accordance with the present invention.

DETAILED DESCRIPTION

Figure 1:
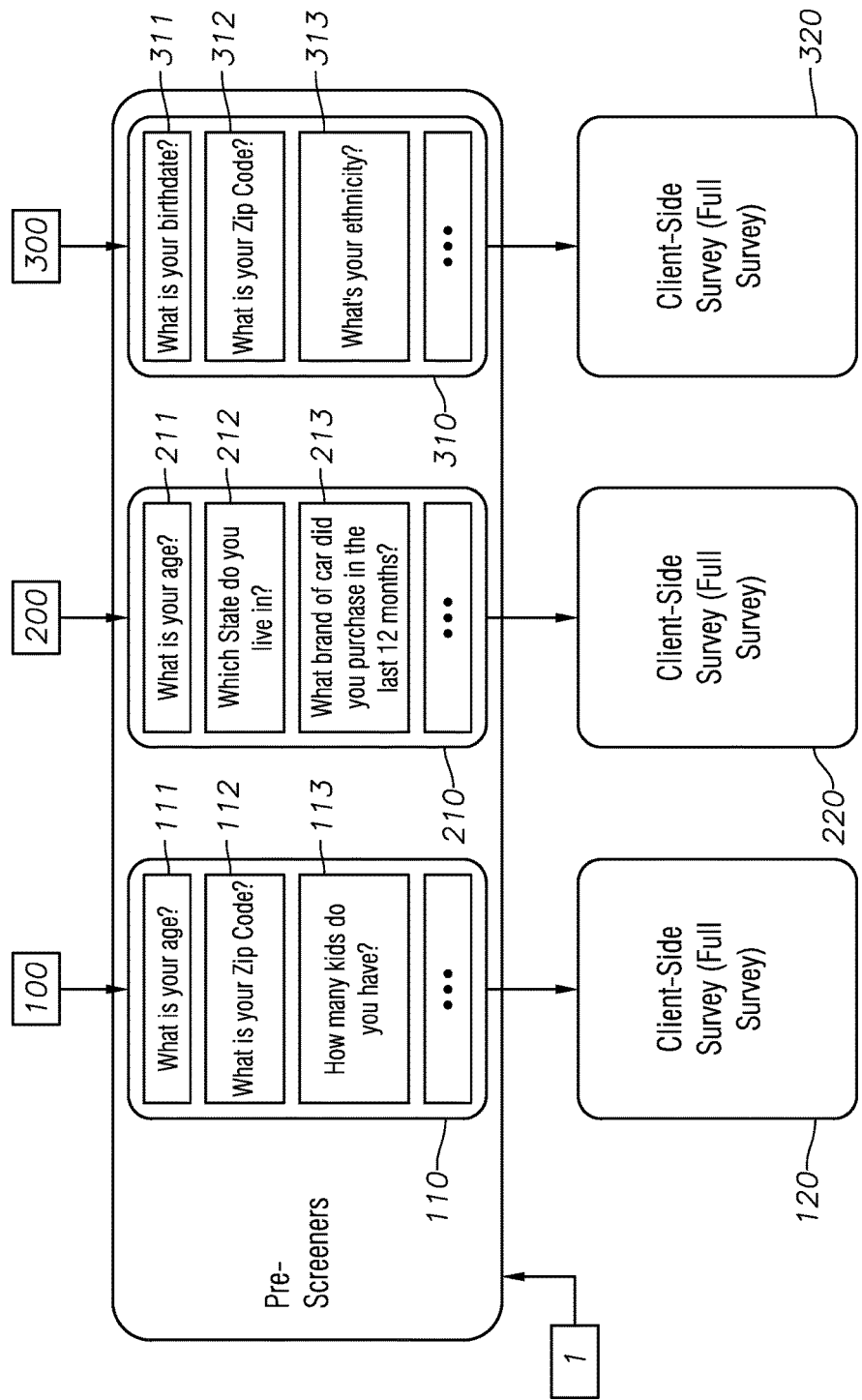
FIG. 1 is a schematic view of a pool of online surveys within a router's survey management system.

Detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed environment. Alternate embodiments may be devised without departing from the spirit or the scope of the invention. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

As used herein, the terms "a" or "an" are defined as one or more than one. The term "plurality," as used herein, is defined as two or more than two. The term "another," as used herein, is defined as at least a second or more. The terms "comprises," "comprising," or any other variation thereof are intended to cover a non-exclusive inclusion, such that a process, method, article, or apparatus that comprises a list of elements does not include only those elements, but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including," "having," or "featuring," as used herein, are defined as comprising (i.e., open language).

An embodiment of the present invention provides a survey platform and process for optimizing the routing experience of a respondent and increasing conversions for suppliers in instances where respondents are utilizing mobile and tablet devices to take online surveys. The process of the present invention ensures that respondents who are attempting to take a survey from a mobile or tablet device will only be sent to surveys where they have a high possibility of taking and completing the survey.

The system of the present invention is configured to track a "mobile conversion rate" metric. The mobile conversion is the total number of completes on the survey ("survey completes" or "mobile survey completes") using mobile or tablet devices divided by the total number of survey entrants using mobile or tablet devices. If the mobile conversion rate is high (e.g. 80% to 100%), the survey will be deemed mobile friendly. If the mobile conversion rate is low (e.g. 0% to 10%), the survey may be non-mobile friendly.

To verify that a low mobile conversion rate is due to the device type, the system of the present invention will also track the mobile conversion delta; i.e., the difference in conversion rates using mobile devices and non-mobile devices. The conversion delta will reveal whether the low conversion rate is due to a reason beyond the device type. For example, if the survey is over 60 minutes long, respondents may not be completing it at a high rate regardless of device type (mobile/tablet or non-mobile/tablet). Thus, if both the mobile conversion rate and the mobile conversion delta are low (e.g. 0% to 10%), the low mobile conversion rate will be deemed to be due to a reason beyond the device type. In contrast, if the mobile conversion rate is low (e.g. 5% to 15%) but the mobile conversion delta is high (e.g. 70% to 90%), the survey will be deemed non-mobile friendly. The router platform will feature logic configured to calculate real-time values for the mobile conversion rate and mobile conversion delta for each survey.

In a first embodiment, the system of the present invention will allow a panel supplier to set a threshold requirement for the mobile conversion delta. Thus, the system's routing decision will be predicated on the survey's mobile conversion delta and the supplier's set threshold level. Every time a respondent is considered for routing into a survey, the system of the present invention will verify that the survey's mobile conversion delta is lower than the supplier's specified threshold level for mobile conversion delta. If the supplier's threshold requirement is satisfied, the system will allow the respondent to be routed into the survey.

In an alternative embodiment, the system of the present invention will allow a panel supplier to set threshold levels for both the mobile conversion rate and the mobile conversion delta. Thus, the system's routing decision will be predicated on the survey's mobile conversion rate; the survey's mobile conversion delta; and the supplier's set threshold levels. Every time a respondent is considered for routing into a survey, the system of the present invention will verify that: (1) the survey's mobile conversion rate is higher than the supplier's specified threshold level for mobile conversion; and (2) the survey's mobile conversion delta is lower than the supplier's specified threshold level for mobile conversion delta. If both threshold requirements are satisfied, the system will allow the respondent to be routed into the survey.

Figure 2:
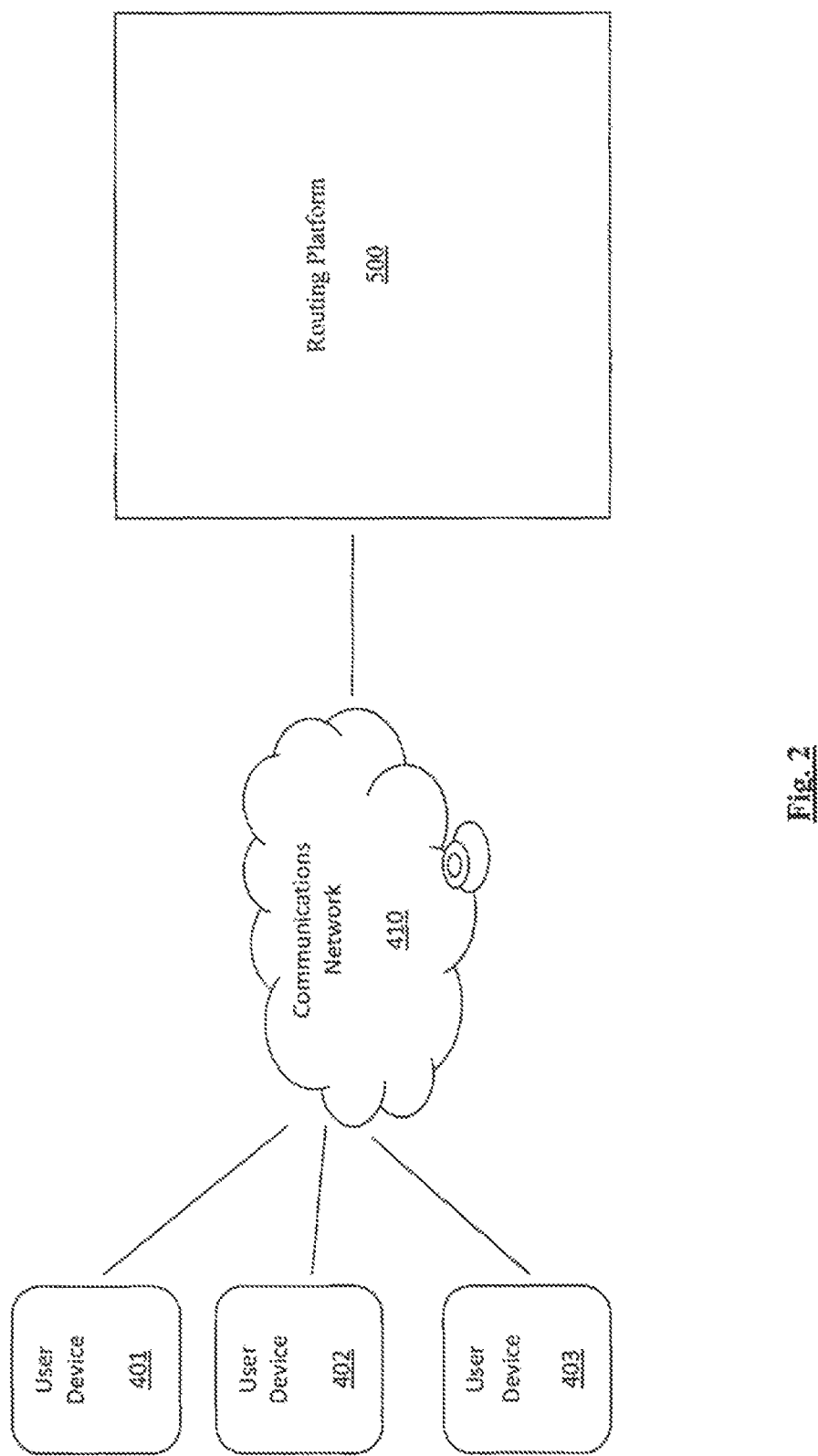
FIG. 2 is a block diagram illustrating the environment in which an embodiment of the routing platform of the present invention operates.

Referring now to FIG. 2, an exemplary environment in which the system of the present invention operates is illustrated. One or more clients (respondents or suppliers) may access the routing platform 500 using their user devices 401, 402, 403 via a communications network 410. In various embodiments, user devices 401, 402, 403 include a desktop computer, a laptop computer, or a mobile device such as a tablet or smartphone. In various embodiments, the communications network 410 includes a local area network (LAN), a wide area network (WAN), a wireless network, an intranet, the internet, and so forth.

Figure 3:
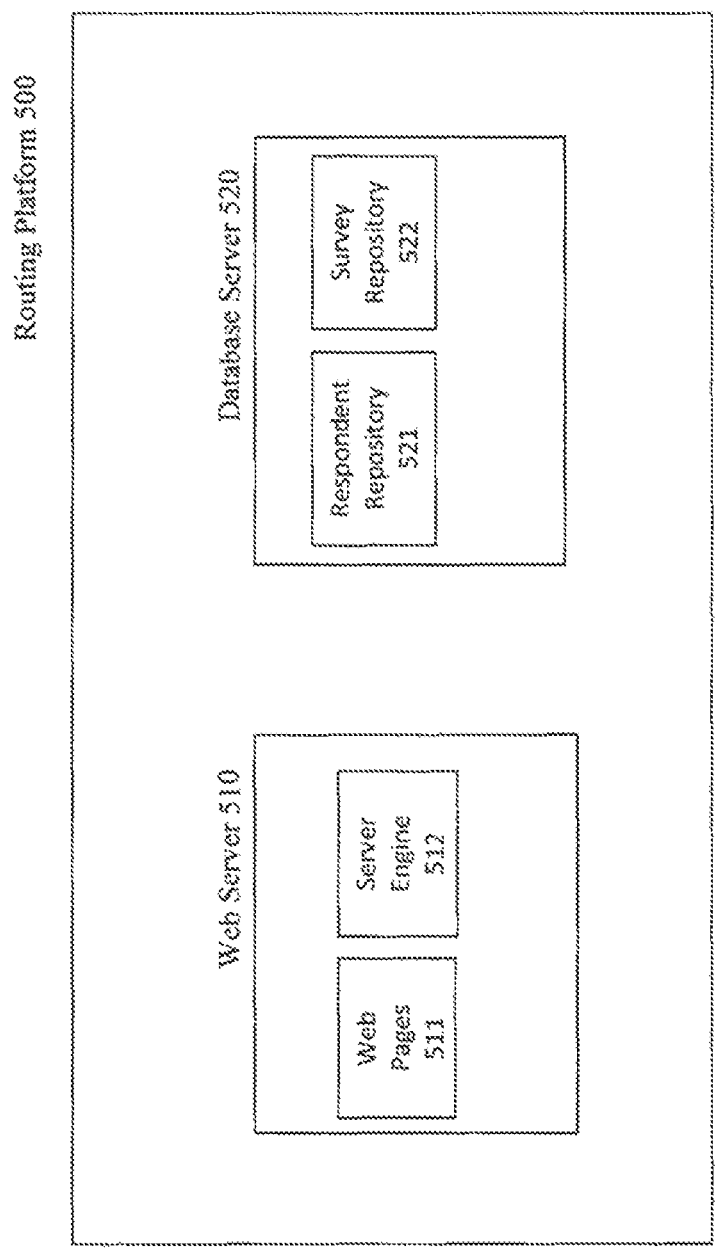
FIG. 3 is a block diagram depicting an embodiment of the routing platform of the present invention.
Figure 4:
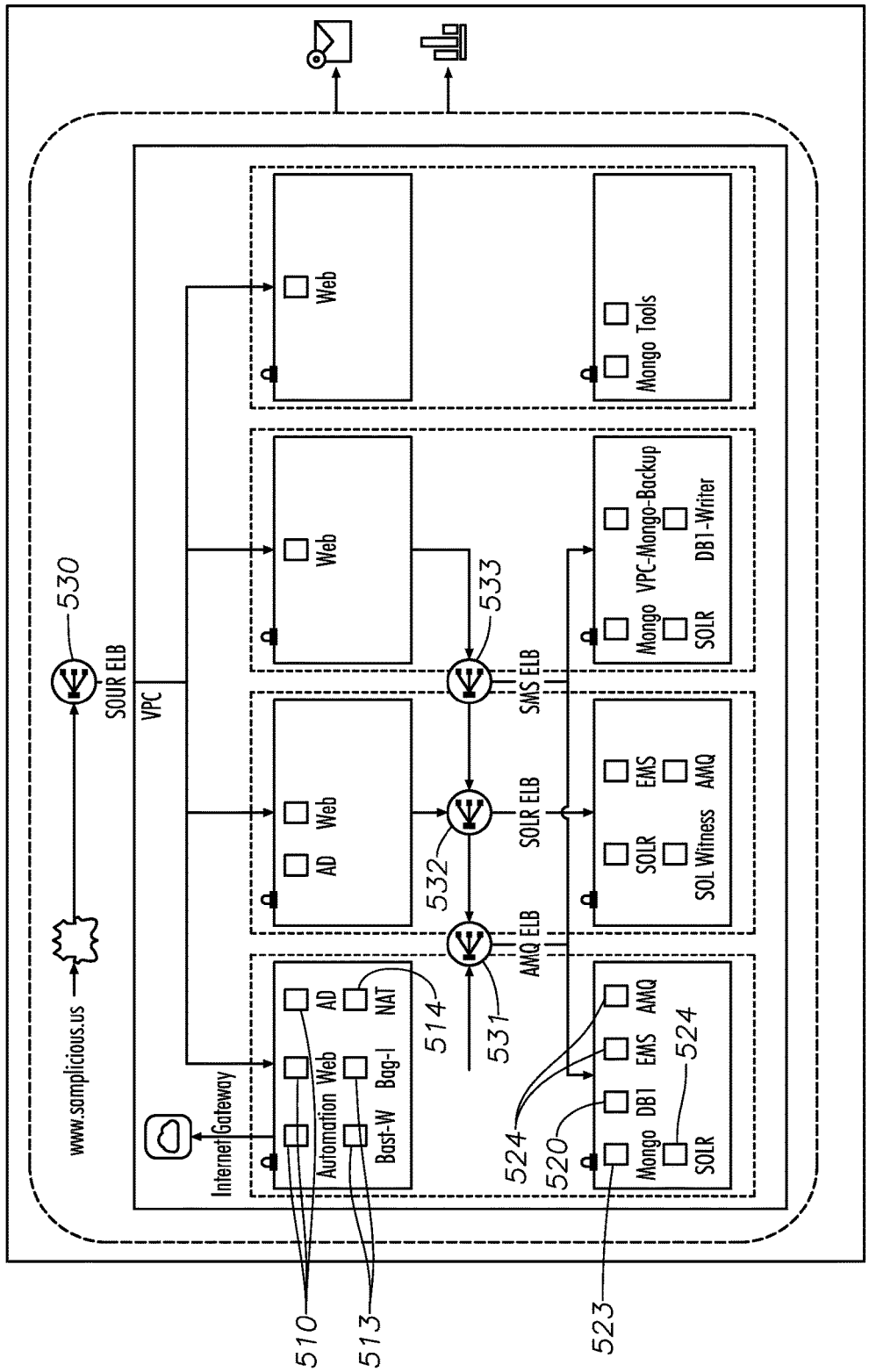
FIG. 4 is a block diagram depicting an exemplary computer architecture of an embodiment of the routing platform of the present invention.

FIGS. 3 and 4 depict exemplary embodiments of the routing platform 500 of the present invention. Referring to FIG. 3, the routing platform 500 may include a web server 510 and a database server 520. The web server 510 may comprise web page(s) 511 and a server engine 512. The database server 520 may comprise a respondent repository 521 and a survey repository 522. In addition to surveys uploaded to the routing platform 500, the survey repository 522 can store a variety of data utilized by the routing platform to provide the functionality described herein, including: i) the mobile conversion rate for each survey; ii) the mobile conversion delta for each survey; iii) the panel supplier's set threshold requirement for mobile conversion delta and, in certain embodiments, the panel supplier's set threshold requirement for the mobile conversion rate; and iv) data pertaining to the survey conversion value (i.e., the percentage of the number of survey completes divided by the number of respondents passing all demographic and targeted questions), the survey incidence value (i.e., the percentage of the number of completed surveys divided by the number of respondents passing all demographic questions), and the length of interview as each survey respondent takes each online survey on the router platform 500.

The web server 510 can communicate with the database server 520 in order to provide the functionality of the router platform 500 described herein. For example, in operation, the web server 510 may receive HTTP requests from a particular respondent's user device 401 to access a web page(s) 511 containing a list of available surveys stored on the database server 520. The web server 510 will communicate with the respondent repository 521 to collect the respondent's saved device information, or alternatively, utilize a device description repository application such as WURFL to collect the respondent's device information. The web server 510 then will communicate with the survey repository 522 to compile a list of available surveys and access the mobile conversion rate for each survey, the mobile conversion delta for each survey, and the panel supplier's threshold settings for mobile conversion delta and, in certain embodiments, the mobile conversion rate. In order to create a mobile-friendly group of online surveys for the respondent, the logic in web server 510 will compare the supplier's threshold settings against the mobile conversion rate and mobile conversion delta for each survey. A listing of qualified surveys will be created by removing, from the listing of available online surveys, any survey where the survey's mobile conversion delta is higher than the mobile conversion delta threshold. The web server 510 will then route the respondent to one of the qualified surveys, such as by providing a web page accessible by the respondent's user device 401 which displays the qualified survey, contains a link to the qualified survey, or otherwise provides a means of accessing the qualified survey whether it is hosted on the router platform 500 or on a third-party platform.

Referring now to FIG. 4, another exemplary embodiment of the routing platform 500 is depicted. One or more elastic load balancers 530, 531, 532, 533 are utilized to balance the traffic across the web and database servers 510, 520. The routing platform 500 may further comprise additional components and applications, such as: an automation server; one or more bastion hosts 513; a network address translation (NAT) application 514; a non-relational database 523 (e.g., MongoDB); and various enterprise search engines 524 (e.g., SOLR, EMS, AMQ). Although the routing platform 500 is described as being comprised of these components in this particular embodiment, fewer or more hardware and software components may comprise the routing platform 500 and still fall within the scope of the system of the present invention. For example, one skilled in the art will recognize that the number of required hardware and software components may be dependent on the features provided by the routing platform 500, such as: allow survey creators to create online surveys; store and host online surveys; present online surveys to respondents; route respondents who are terminated from a first online survey to other online surveys; present survey results and other output data related to the online surveys to survey creators and/or survey administrators; allow a survey administrator to manage the database of online surveys; allow a supplier to set mobile conversion rate and/or mobile conversion delta threshold settings for each survey; measure and record one or more survey properties as each survey respondent takes each online survey on the router platform; calculate in real-time the mobile conversion rate and mobile conversion delta from the recorded properties; and compare the panel supplier's threshold settings to each survey's mobile conversion rate and mobile conversion delta. One skilled in the art will recognize that the number of required hardware and software components may be dependent on the features provided by the router platform 500.

Figure 5:
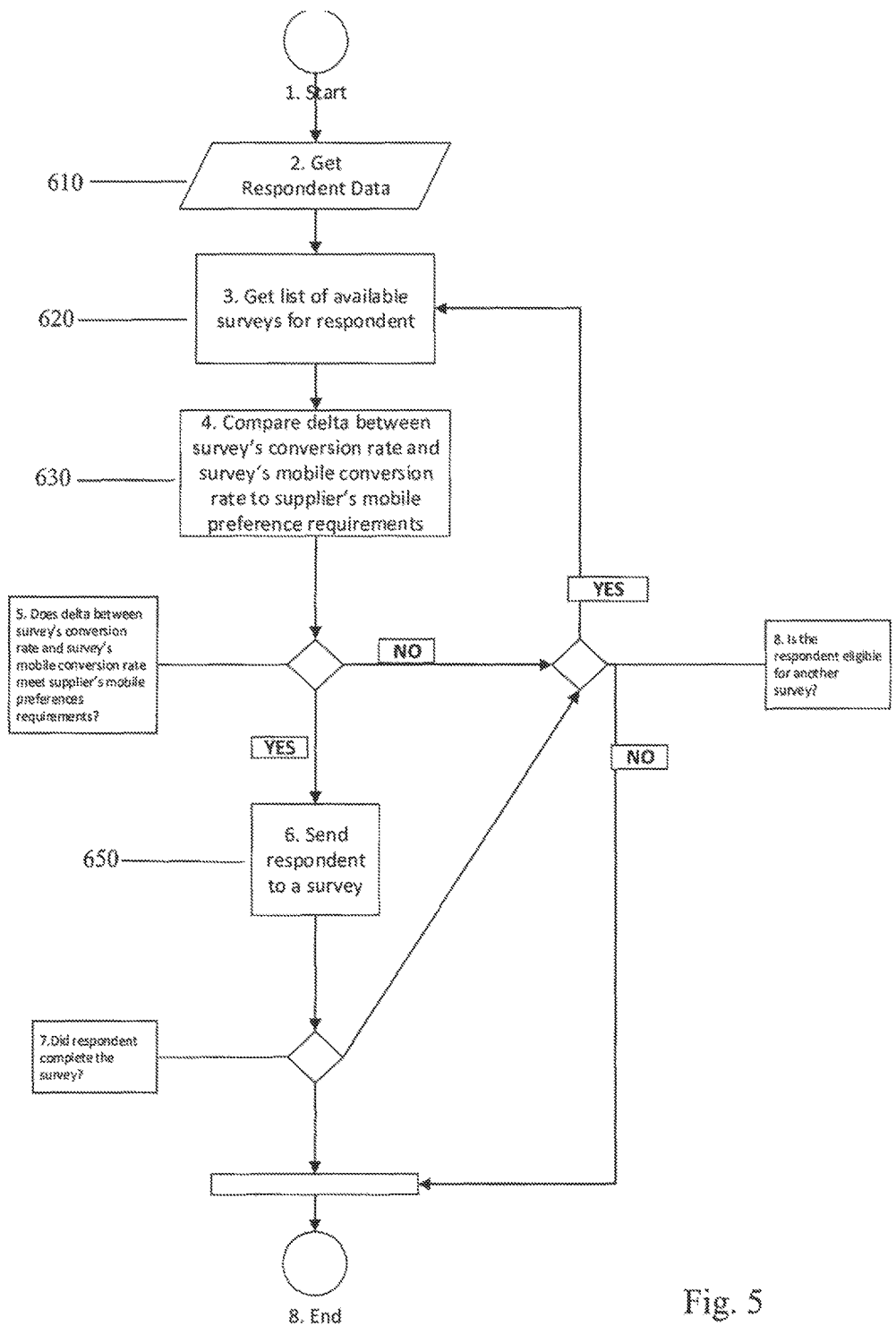
FIG. 5 is a flow diagram depicting an embodiment of the process of the present invention for optimizing an online survey platform in instances where respondents are utilizing mobile and tablet devices to take online surveys.

FIG. 5 is a flow diagram depicting an exemplary process of the present invention for optimizing an online survey platform in instances where respondents are utilizing mobile and tablet devices to take online surveys. In step 610, the routing platform 500 accesses the respondent's device information to identify the type of device being used by a respondent to access the system. In step 620, the routing platform 500 compiles a list of available surveys for the respondent. In step 630, the routing platform 500 compares the mobile conversion delta of a first survey to the threshold requirement provided by the supplier of the panel to which the respondent belongs. If the threshold requirement is satisfied, the respondent is sent to the first survey in step 650. Once completed, the respondent's session on the routing platform 500 will be closed. If the threshold requirements are not met, or if the respondent fails to complete the first survey, the routing platform 500 will send the respondent to a listing of other available surveys and the aforementioned process will repeat (starting with step 630). If no qualified surveys are available, the respondent's session on the routing platform 500 will be closed.

Figure 6:
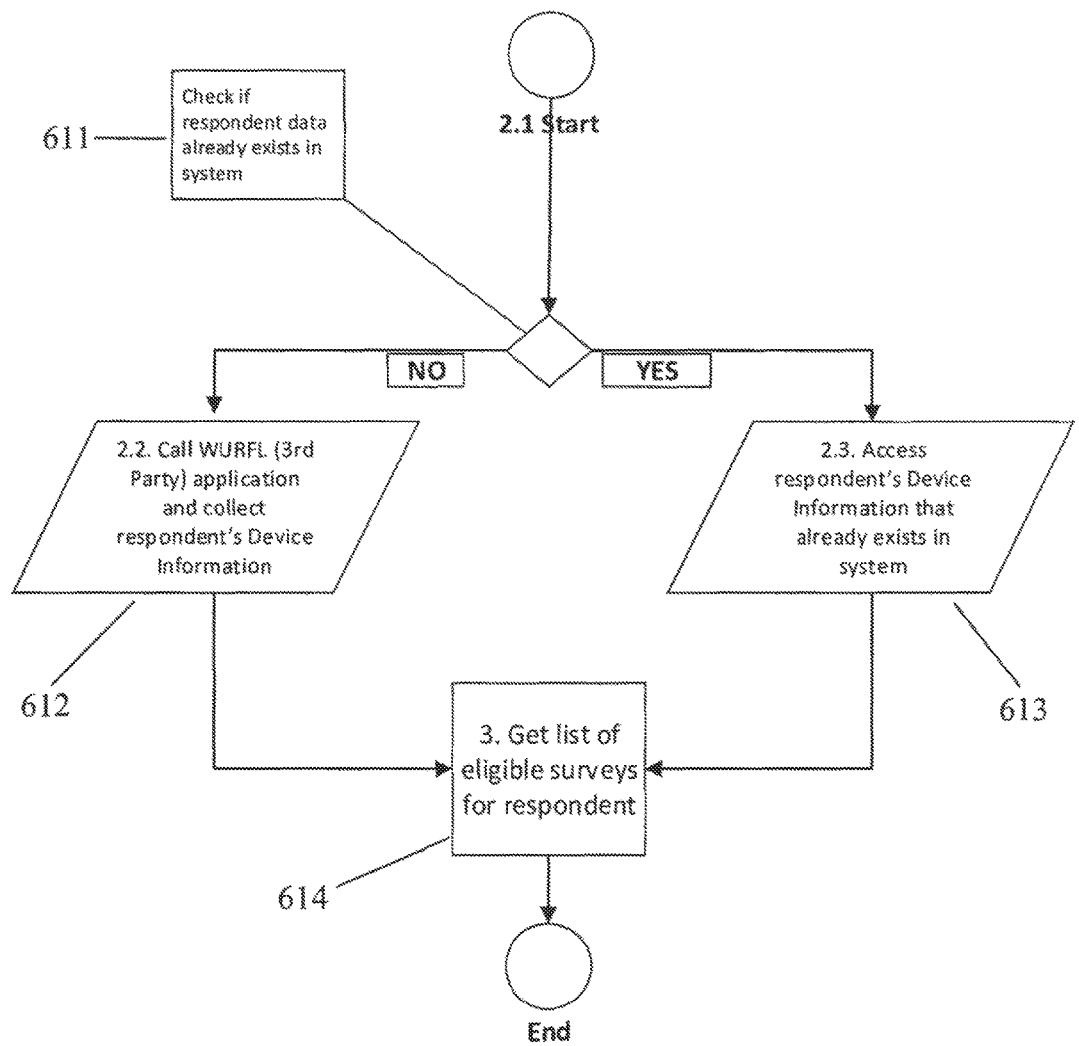
FIG. 6 is a flow diagram depicting an exemplary process for identifying the type of device being used by a respondent to access the system of the present invention.

As shown in FIG. 5 above, the routing platform 500 accesses the respondent's device information in step 610 before compiling a list of available surveys for the respondent. An exemplary process for identifying the type of device being used by the respondent to access the routing platform 500 of the present invention is depicted in FIG. 6. In step 611, the system will access the respondent repository 521 of the database server 520 to determine if the respondent's device information already exists in the system. The device information of a respondent returning to the routing platform 500 may be stored as a record in the client repository 521, thereby allowing the system to collect respondent's device information from the system's database server 520 (step 613). If the respondent's device information is not already saved on the database server 520, the system may utilize a mobile device detection application, such as WURFL, to collect respondent's device information (step 612). Once the respondent's device information is obtained, the routing platform 500 will compiles a list of available surveys for the respondent in step 614.

Figure 7:
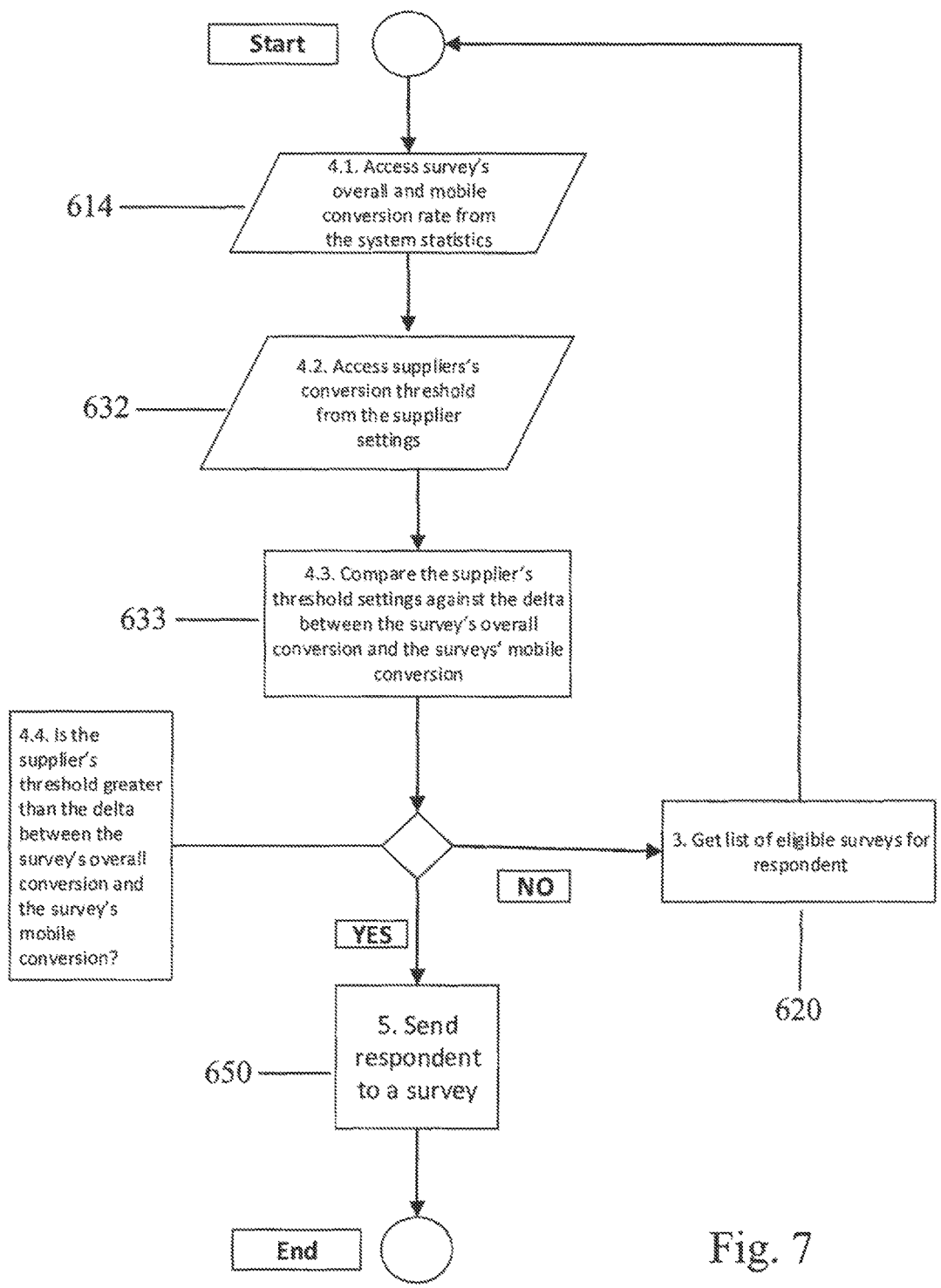
FIG. 7 is a flow diagram depicting an exemplary process for determining whether a particular survey satisfies the supplier's threshold requirements.

FIG. 7 is a flow diagram depicting an exemplary process for determining whether a particular survey satisfies the supplier's threshold requirements (See FIG. 4, step 630). In step 631, the server engine 512 will access the survey's overall conversion rate and mobile conversion rate stored in the survey repository 522. The server engine 512 will then access the supplier's conversion threshold settings from the survey repository 522 (step 632) and compare these settings to the mobile conversion rate and mobile conversion delta of the particular survey (step 633). If the mobile conversion delta (and in alternative embodiments, the mobile conversion rate) meet the supplier's threshold requirement(s), then the routing platform 500 will send the respondent to the survey in step 650. If not, the routing platform 500 will once again compile a list of available surveys for the respondent (step 620) and reinitiate the process described herein.

The foregoing description and accompanying drawings illustrate the principles, exemplary embodiments, and modes of operation of the invention. However, the invention should not be construed as being limited to the particular embodiments discussed above. Many modifications of the embodiments described herein will come to mind to one skilled in the art having the benefit of the teaching presented in the foregoing descriptions and the associated drawings. Accordingly, it should be appreciated that variations to those embodiments can be made by those skilled in the art without departing from the scope of the invention.

What is claimed is:

1. A method in a survey platform for routing a respondent using a mobile device among a plurality of online surveys hosted on the survey platform, the method comprising the steps of:
   receiving, over a communication network from a respondent's mobile device, a request to access a listing of available online surveys;
   collecting the respondent's mobile device information;
   accessing a survey repository database to compile the listing of available online surveys;
   calculating a mobile conversion rate for each of the available online surveys, wherein the mobile conversion rate is a total number of completions by respondents for the available online survey using mobile devices divided by a total number of entries by respondents into the available online survey using mobile devices;
   calculating a conversion rate for each of the available online surveys, wherein the conversion rate is a total number of completions by respondents for the available online survey using all devices divided by a total number of entries by respondents into the available online survey using all devices;
   calculating a mobile conversion delta for each of the available online surveys, wherein the mobile conversion delta is the difference between the mobile conversion rate for the available online survey and the conversion rate for the available online survey;
   for each of the available online surveys, comparing the mobile conversion delta to a mobile conversion delta threshold and the mobile conversion rate to a mobile conversion rate threshold;
   creating a listing of qualified surveys by removing, from the listing of available online surveys, any survey where the mobile conversion delta is higher than the mobile conversion delta threshold and the mobile conversion rate is lower than the mobile conversion rate threshold; and
   providing a connection, to the mobile device, for a first online survey selected from the listing of qualified surveys.

2. The method of claim 1, further comprising receiving, over a communication network, the mobile conversion delta threshold from a panel supplier.

3. The method of claim 2, further comprising accessing the survey repository database to retrieve the mobile conversion delta threshold associated with the first online survey.

4. The method of claim 3, further comprising accessing the survey repository database to retrieve a total number of completions of the first online survey using mobile devices and a total number of entries into the first online survey using mobile devices.

5. The method of claim 4, further comprising the step of accessing the survey repository database to retrieve the total number of survey completes of the first online survey using mobile devices, and the total number of entries into the first online survey using mobile devices.

6. The method of claim 5, wherein calculating a mobile conversion rate for the first online survey comprises dividing the total number of completions of the first online survey using mobile devices by the total number of entries into the first online survey using mobile devices.

7. The method of claim 6, wherein calculating a mobile conversion delta for the first online survey comprises subtracting the mobile conversion rate of the first online survey from an overall conversion rate of the first online survey.

8. The method of claim 1, further comprising receiving, over a communication network, the mobile conversion rate threshold from a panel supplier.

9. A method in a survey platform for routing a respondent using a mobile device among a plurality of online surveys hosted on the survey platform, the method comprising the steps of:
receiving, over a communication network from a mobile device, a mobile conversion delta threshold from a supplier;
calculating a mobile conversion rate for a first online survey, wherein the mobile conversion rate is a total number of completions by respondents for the first online survey using mobile devices divided by a total number of entries by respondents into the first online survey using mobile devices;
calculating a conversion rate for the first online survey, wherein the conversion rate is a total number of completions by respondents for the first online survey using all devices divided by a total number of entries by respondents into the first online survey using all devices;
calculating a mobile conversion delta of the first online survey, wherein the mobile conversion delta is the difference between the mobile conversion rate for the first online survey and the conversion rate for the first online survey;
comparing the mobile conversion delta of the first online survey to the mobile conversion delta threshold and the mobile conversion rate to a mobile conversion rate threshold;
determining that the mobile conversion delta of the first online survey is higher than the mobile conversion delta threshold and the mobile conversion rate is lower than the mobile conversion rate threshold;
adding the first online survey to a set of qualified online surveys; and
providing a connection, to the mobile device, for the set of qualified online surveys.

10. The method of claim 9, wherein a web server communicates with a survey repository to calculate the mobile conversion rate and the mobile conversion delta of the first online survey.

11. The method of claim 10, further comprising transmitting, over the communication network to the mobile device, a link for accessing the first online survey.

12. At least one non-transitory computer readable medium including instructions for routing a respondent using a mobile device among a plurality of online surveys hosted on the survey platform that when executed by at least one processor, cause the at least one processor to:
receive, over a communication network from a respondent's mobile device, a request to access a listing of available online surveys;
access a survey repository database to compile the listing of available online surveys;
calculate a mobile conversion rate for each of the available online surveys, wherein the mobile conversion rate is a total number of completions by respondents for the available online survey using mobile devices divided by a total number of entries by respondents into the available online survey using mobile devices;
calculate a conversion rate for each of the available online surveys, wherein the conversion rate is a total number of completions by respondents for the available online survey using all devices divided by a total number of entries by respondents into the available online survey using all devices;
calculate mobile conversion delta for each of the available online surveys, wherein the mobile conversion delta is the difference between the mobile conversion rate for the available online survey and the conversion rate for the available online survey;
for each of the available online surveys, compare the mobile conversion delta to a mobile conversion delta threshold and the mobile conversion rate to a mobile conversion rate threshold;
create a listing of qualified surveys by removing, from the listing of available online surveys, any survey where the mobile conversion delta is higher than the mobile conversion delta threshold and the mobile conversion rate is lower than the mobile conversion rate threshold; and
provide a connection, to the mobile device, for a first online survey selected from the listing of qualified surveys.

13. The at least one computer readable medium of claim 12, further comprising instructions to:
collect the respondent's mobile device information.

14. The at least one computer readable medium of claim 12, further comprising instructions to:
receive, over a communication network, the mobile conversion delta threshold from a panel supplier.

15. The at least one computer readable medium of claim 12, further comprising instructions to:
receive, over a communication network, the mobile conversion rate threshold from a panel supplier.

* * * * *